United States Patent [19]

Hirai et al.

[11] 4,280,083
[45] Jul. 21, 1981

[54] APPARATUS FOR LIMITING ACCELERATION IN A SERVOSYSTEM

[75] Inventors: Hiromu Hirai, Yatabemachi; Shin Hamano, Shimoinayoshi, both of Japan

[73] Assignee: Hitachi, Ltd., Tokyo, Japan

[21] Appl. No.: 58,370

[22] Filed: Jul. 17, 1979

[30] Foreign Application Priority Data

Jul. 17, 1978 [JP] Japan .................. 53-86099

[51] Int. Cl.³ .............................. G05B 23/02
[52] U.S. Cl. ..................... 318/565; 318/616; 318/617; 318/561
[58] Field of Search ............ 318/563, 565, 566, 561, 318/618, 619, 617; 91/364

[56] References Cited

U.S. PATENT DOCUMENTS

| | | | |
|---|---|---|---|
| 2,927,070 | 3/1960 | DeShong, Jr. | 318/563 X |
| 3,201,675 | 8/1965 | Curran et al. | 318/566 |
| 3,686,568 | 8/1972 | MacMullan | 318/566 X |
| 3,990,020 | 11/1976 | Porter | 318/566 |
| 4,031,483 | 6/1977 | Formeister | 318/563 X |
| 4,063,140 | 12/1977 | Kammerer et al. | 318/565 X |
| 4,191,913 | 3/1980 | Arnold et al. | 318/565 X |

*Primary Examiner*—B. Dobeck
*Attorney, Agent, or Firm*—Craig and Antonelli

[57] ABSTRACT

A servosystem in which means are provided so as to prevent impartation of an excessively high acceleration to its movable part even when an abnormal input signal is applied to the servosystem. The apparatus comprises an acceleration limiter circuit which modifies such an abnormal input signal so that an acceleration higher than a predetermined level may not be imparted to the movable part.

4 Claims, 7 Drawing Figures

4,280,083

APPARATUS FOR LIMITING ACCELERATION IN A SERVOSYSTEM

BACKGROUND OF THE INVENTION

1. Field Of The Invention

This invention relates to a servosystem capable of preventing impartation of an abnormally high acceleration to an object to be controlled.

2. Description Of The Prior Art

As an example of applications of servosystem, there is a vibration tester which employs an electrohydraulic servo, for effecting a vibration tolerance test. In this vibration tester, a test structure which requires safety agaist severe vibrations is placed on a shake table which is a movable part of the vibration tester, and this table is vibrated by the associated electro-hydraulic servo, so as to subject the test structure to a vibration tolerance test. The vibration tester of the kind described above employing the electro-hydraulic servo for conducting the vibration tolerance test comprises generally a displacement control system. The basic structure and operation of this displacement control system will now be briefly described. A displacement reference input signal representing the desired displacement of the shake table is applied in the form of a voltage signal. This displacement reference input signal is compared in a comparator with a voltage signal obtained by converting the actual displacement of the shake table by a displacement detector. The comparator output signal indicative of the error between the desired displacement and the actual displacement, that is, the signal indicative of the controlled deviation, is applied to a servo amplifier to be subjected to current amplification, and the output signal of the servo amplifier is applied to a servo-valve. In response to this current input signal, the servo-valve controls the direction and flow rate of a hydraulic fluid supplied to a hydraulic cylinder driving the shake table until finally the controlled deviation between the desired displacement and the actual displacement of the shake table is nullified.

It is commonly acknowledged that, in such a servosystem, a high acceleration is produced in the shake table in the instant of emergency stop of the shake table. A device for suppressing such an acceleration is disclosed in Japanese Utility Model Publication No. SH051-42373 published Oct. 15, 1976. The displacement reference input signal is also another factor which imparts a high acceleration to the shake table. This displacement reference input signal is generally applied from a signal generator such as, a function generator, a data recorder or an electronic computer. In the event of occurrence of an abnormal operating condition in such a signal generator or in the event of application of an abnormal input signal due to a maloperation by the operator, an excessively high acceleration will be imparted to the shake table tending to destroy the test structure placed on the table. Also, when the applied input signal has a random waveform, it is difficult to predict the degree of acceleration produced in the shake table. However, when, for example, the test structure is manufactured at a great deal of costs, prevention of generation of an excessively high acceleration in the shake table is one of the important technical problems to be solved for the protection of the expensive test structure.

SUMMARY OF THE INVENTION

It is an object of the present invention to provide a servosystem capable of preventing generation of an excessively high acceleration in the movable part due to application of an abnormal input signal.

Another object of the present invention is to provide a servosystem in which an acceleration signal of a level higher than a predetermined level is prevented from being applied to the movable part of the servosystem.

Still another object of the present invention is to provide a servosystem which is capable of slowly stopping the motion of the shake table when an acceleration signal of a level higher than a setting related to the input signal is detected.

To attain the above objects of the present invention, in a servosystem in which a servo-valve converts a displacement reference input signal into a corresponding hydraulic power so as to drive an actuator by the hydraulic power to subject a movable part to a controlled displacement by the actuator, there is provided a limiter circuit for limiting the amplitude of an acceleration signal obtained on the basis of the displacement reference input signal to a level lower than a predetermined level and for producing a displacement signal on the basis of the limited acceleration signal, so as to apply this displacement signal to the servo-valve.

Other objects, features and advantages of the present invention will become more apparent from the following detailed description of preferred embodiments thereof taken in conjunction with the accompanying drawings.

DESCRIPTION OF THE PREFERRED EMBODIMENTS

The present invention relates to a servosystem including an actuator for generating a linear drive force, a rotary drive force or any other suitable type of actuating force, and a movable part connected to the actuator to be controlled by the latter. Herein, the present invention will be described specifically with reference to its application to a vibration tester provided with an electrohydaulic servosystem, in view of the fact that the meritorious effects of the present invention are especially conspicuously exhibited in such an application.

Figure 1:
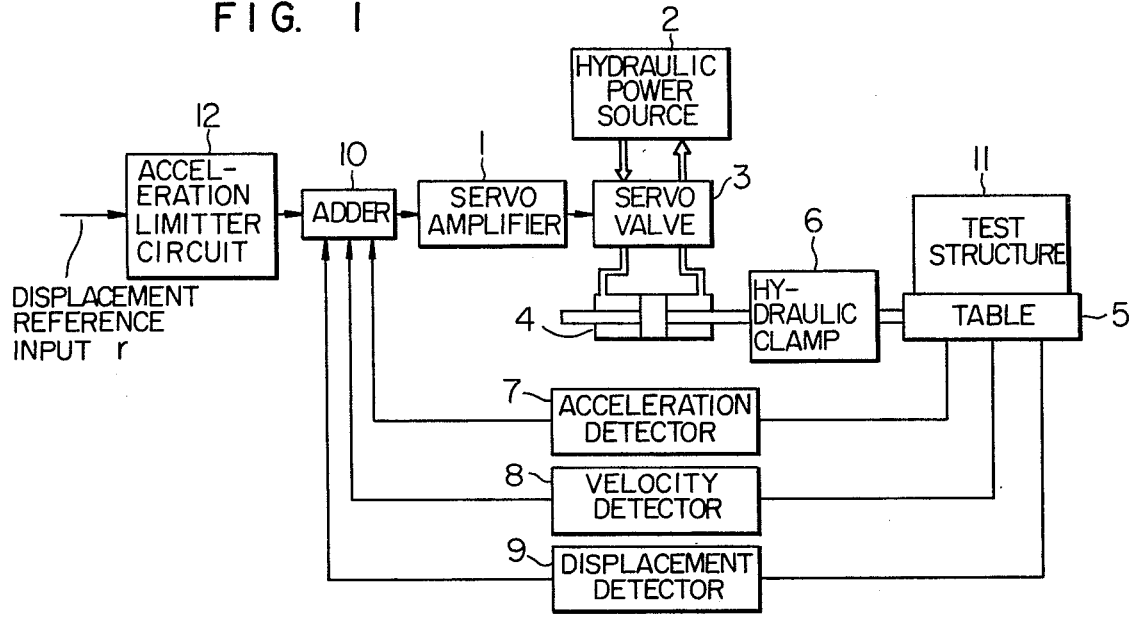
FIG. 1 is a block diagram showing generally the structure of a preferred embodiment of the present invention in the form of a vibration tester provided with an electro-hydraulic servosystem.

Referring to FIG. 1, a vibration tester provided with an electro-hydraulic servosystem comprises a servo amplifier 1, a hydraulic power source 2, a servo-valve 3, an actuator 4, a shake table 5 which is a movable object to be controlled, a hydraulic clamp 6 connecting the actuator 4 to the shake table 5, an acceleration-, a velocity- and a displacement-detector 7, 8 and 9, respectively, for detecting the controlled variables of the shake table 5, and an adder 10 for comparing the output signals of the detectors 7, 8, and 9 with a displacement reference input signal r. Placed on the shake table 5 is a test structure 11 which is subjected to a vibration tolerance test. The displacement reference input signal r is applied from a signal generator (not shown).

In the servosystem of this vibration tester, the displacement reference input signal r for causing the controlled displacement of the shake table 5 is applied in the form of a voltage signal. The displacement detector 9 detects the actual displacement of the shake table 5 to provide an output signal in the form of a voltage signal which is applied to the adder 10 to be compared with the displacement reference input signal r. The error signal indicative of the controlled deviation which is the difference between the displacement reference input signal r and the output signal from the displacement detector 9 is applied from the adder 10 to the servo amplifier 1, and after being subjected to current amplification, is applied to the servo-valve 3 as a current input signal thereto. In response to the current input signal, the servo-valve 3 controls the direction and flow rate of the hydraulic fluid supplied from the hydraulic power source 2 to the actuator 4. Consequently, the displacement of the shake table 5 is controlled in a way in which the controlled deviation is finally nullified. Thus, the displacement of the shake table 5 follows the displacement reference input signal r, and the shake table 5 is displaced according to the displacement instruction provided by the displacement reference input signal r. In FIG. 1, a velocity feedback loop and an acceleration feedback loop for compensation purposes are provided in addition to the displacement feedback loop which is the main feedback loop, in order to enhance the stability of the control system and to improve the response of the control system.

According to the present invention, the displacement reference input signal r is applied to an acceleration limiter circuit 12 instead of being directly applied to the adder 10. This acceleration limiter circuit 12 comprises means for producing an acceleration signal on the basis of the displacement reference input signal r, for limiting the amplitude of the acceleration signal to a level lower than a predetermined level, and for producing a displacement signal on the basis of the limited acceleration signal. In other words, this acceleration limiter circuit 12 comprises an electrical simulation circuit, such as, for example, that used in an analog computer, which has a response characteristic similar to that of the output displacement of the shake table 5 connected to the servosystem, and a limiter element limiting the simulated acceleration output signal of the simulation circuit appearing in response to the displacement reference input signal r.

Figure 2:
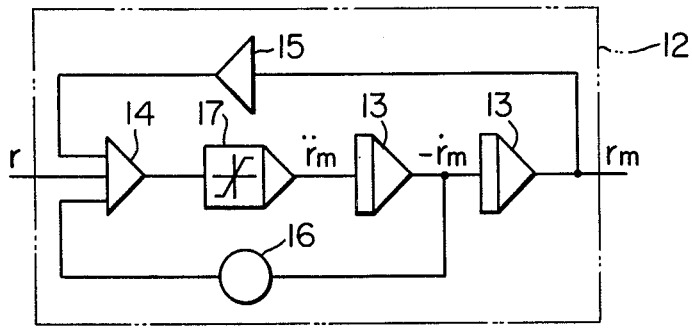
FIG. 2 shows the practical structure of one form of the acceleration limiter circuit employed in the embodiment of the present invention shown in FIG. 1.

FIG. 2 shows the practical structure of one form of the acceleration limiter circuit 12. In the form shown in FIG. 2, a simulation circuit of second order system is employed to simulate the response characteristic of the output displacement of the shake table 5 connected to the servosystem. Referring to FIG. 2, the acceleration limiter circuit 12 comprises two integrators 13, an adder 14, an inverter 15 inverting the sign of its input signal, a potentiometer 16 and a limiter 17. In response to the application of a displacement reference input signal r, the acceleration limiter circuit 12 operates in such a manner that the last-stage or second integrator 13 provides a displacement output signal $r_m$ which follows the displacement reference input signal r, and this signal $r_m$ is applied to the servosystem.

The function of the limiter 17 in the acceleration limiter circuit 12 will now be described. Suppose that an abnormal displacement reference input signal r is applied to the acceleration limiter circuit 12. If the limiter 17 were not provided in this circuit 12, an abnormal displacement output signal $r_m$ would appear from the acceleration limiter circuit 12 and would be finally applied to the servosystem of the vibration tester thereby imparting an abnormally high acceleration to the vibration table 5. Due to, however, the fact that the limiter 17 is included in the acceleration limiter circuit 12 shown in FIG. 2, the acceleration output signal $_m$ of the limiter 17 in the acceleration limiter circuit 12 applying the displacement signal $r_m$ to the servosystem is limited to a voltage level lower than a predetermined setting by the limiter 17. Further, since the displacement output signal $r_m$ of the acceleration limiter circuit 12 is obtained by integrating the limited acceleration output signal $_m$ of the limiter 17 by the first integrator 13 and then integrating the velocity output signal $-_m$ of the first integrator 13 by the second integrator 13, the voltage level of the displacement output signal $r_m$ of the acceleration limiter circuit 12 does not in any way exceed the voltage level of the limited acceleration output signal $_m$ of the limiter 17. Thus, a displacement signal of limited level can be applied from the acceleration limiter circuit 12 to the servosystem in spite of the application of an abnormal displacement reference input signal r thereto. Therefore, the present invention, when applied to, for example, the vibration tester provided with the electro-hydraulic servosystem shown in FIG. 1, provides such a great advantage that the test structure 11 can be protected against damage.

Figure 4:
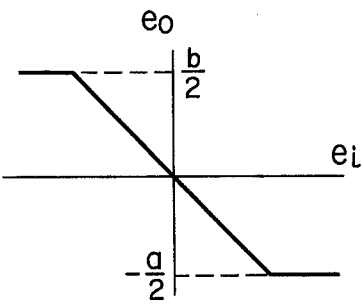
FIG. 4 is a characteristic diagram showing the relation between the input and the output of the limiter shown in FIG. 3.
Figure 3:
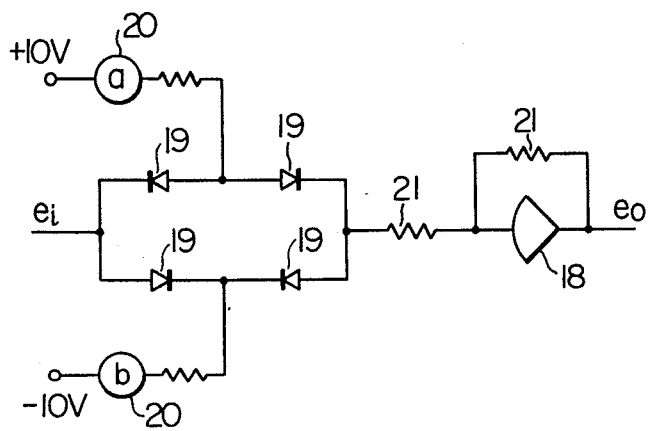
FIG. 3 shows the practical structure of one form of the limiter in the acceleration limiter circuit shown in FIG. 2.

The limiter 17 in the acceleration limiter circuit 12 shown in FIG. 2 may embody various forms and may have a circuit structure as, for example, shown in FIG. 3. Referring to FIG. 3, the limiter 17 comprises an operational amplifier 18, diodes 19, potentiometers 20 and resistors 21. FIG. 4 shows the relation between the voltage input $e_i$ and the voltage output $e_o$ of the limiter 17 shown in FIG. 3. The saturating voltage level shown in FIG. 4 can be varied as desired by varying the respective settings a and b of the potentiometers 20, so that the level of the displacement signal $r_m$ applied from the acceleration limiter circuit 12 to the servosystem can be limited as desired.

Figure 5:
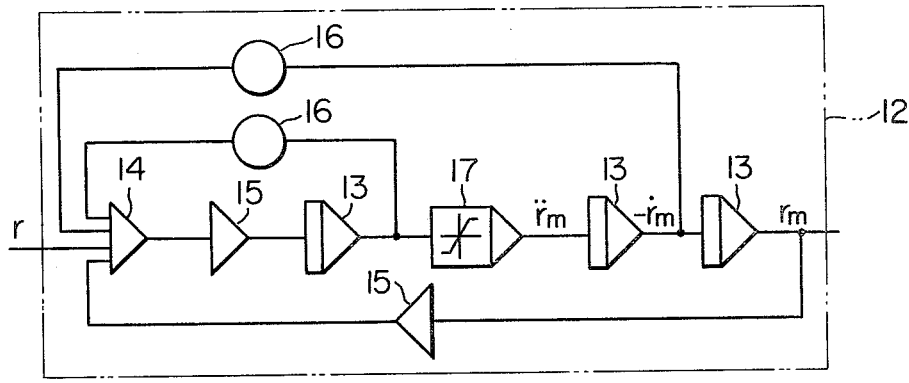
FIG. 5 shows the practical structure of another form of the acceleration limiter circuit employed in the embodiment of the present invention shown in FIG. 1.

While the acceleration limiter circuit 12 comprising a simulation circuit of second order system is shown in FIG. 2, by way of example, that of third or higher order system may be employed depending on the service. FIG. 5 shows, by way of example, an acceleration limiter circuit 12 comprising a simulation circuit of third order system. In FIG. 5, like reference numerals are used to denote like parts appearing in FIG. 2.

Although the arrangement shown in FIG. 1 is effective in limiting the acceleration level, an abrupt limitation of the acceleration may conversely give rise to an abrupt increase in the level of the desplacement signal $r_m$ appearing from the acceleration limiter circuit 12 until finally the displacement of the shake table 5 driven by the servosystem may exceed the predetermined limit. Further, from the viewpoint of practical operation, it may be desirable to slowly stop the operation of the servosystem when an abnormal displacement reference input signal r is applied.

Figure 6:
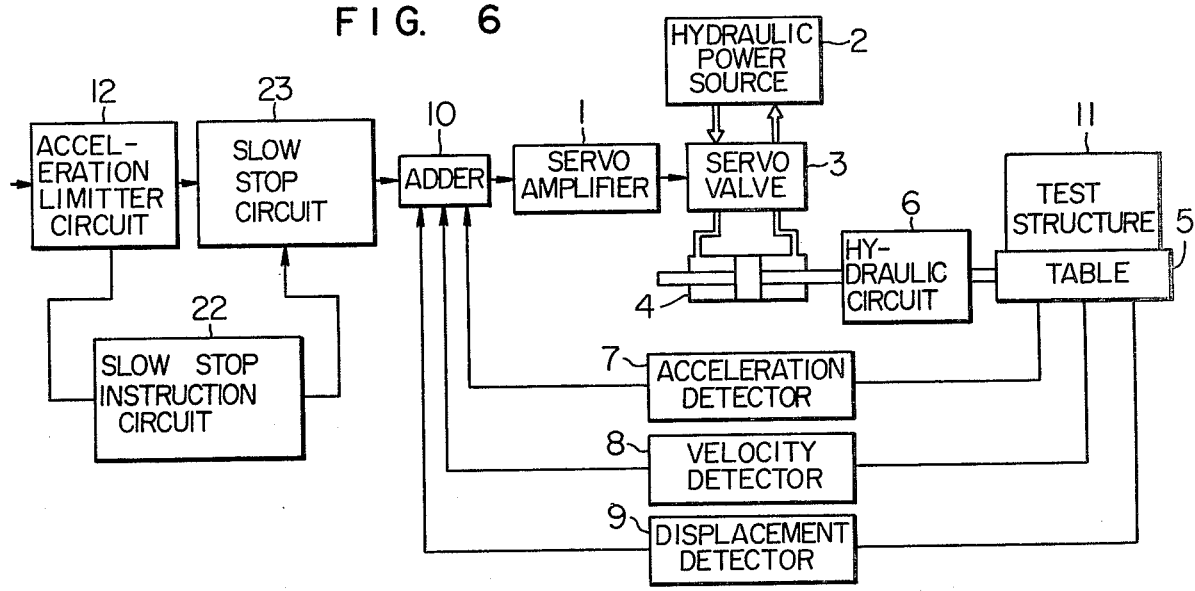
FIG. 6 is a block diagram showing generally the structure of another embodiment of the present invention in the form of a vibration tester provided with an electro-hydraulic servosystem.

A modification of the servosystem which is constructed to meet such a requirement is shown in FIG. 6. Referring to FIG. 6, the modification comprises, in addition to the aforementioned acceleration limiter circuit 12, a slow stop instruction circuit 22 for generating an instruction output signal for attenuating the displacement output signal $r_m$ from the acceleration limiter circuit 12 in response to the amplitude of the acceleration output signal $_m$ from the limiter 17 in the acceleration limiter circuit 12, and a slow stop circuit 23 for attenuating the displacement output signal $r_m$ from the acceleration limiter circuit 12 in response to the instruction output signal from the slow stop instruction circuit 22, so that the undersirable excessive displacement of the shake table 5 can be avoided.

Figure 7:
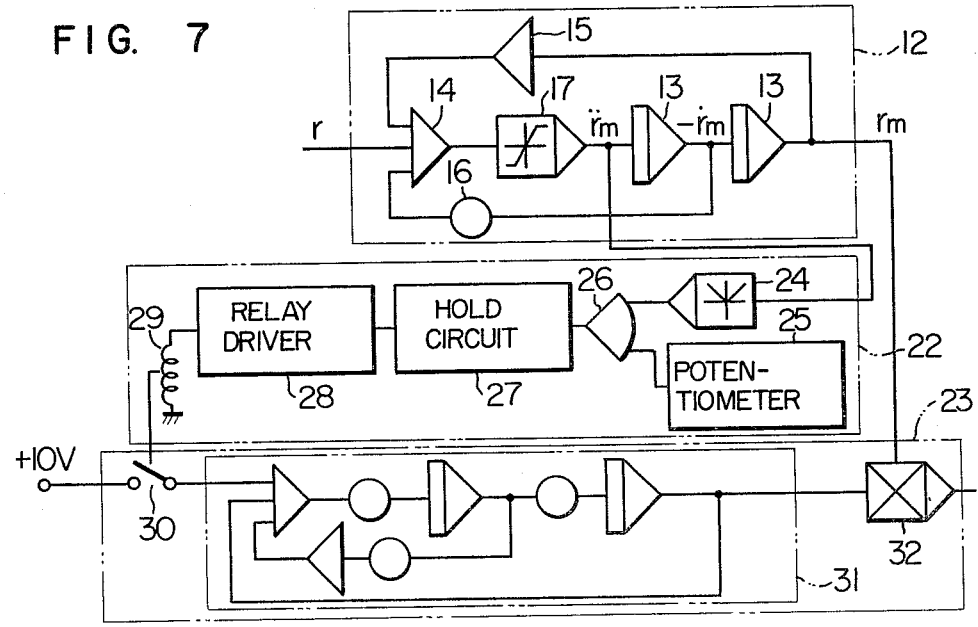
FIG. 7 shows the practical structure of one form of the acceleration limiter circuit, slow stop instruction circuit and slow stop circuit shown in FIG. 6.

FIG. 7 shows in detail the structure of the acceleration limiter circuit 12, slow stop instruction circuit 22 and slow stop circuit 23 in the modification shown in FIG. 6. The structure of the acceleration limiter circuit 12 in FIG. 7 is entirely the same as that shown in FIG. 2, and therefore, any detailed description is unnecessary. The slow stop instruction circuit 22 comprises an absolute value circuit 24 for finding the absolute value of the acceleration output signal $_m$ from the limiter 17 in the acceleration limiter circuit 12, a potentiometer 25 providing an output signal indicative of the acceleration limit, a comparator 26 for comparing the amplitude of the out-out signal from the absolute value circuit 24 with the output signal from the potentiometer 25, a hold circuit 27 (which may practically be a flip-flop or the like) holding the memory of the initial state of operation of the comparator 26, a relay driver 28 energized depending on the state of the hold circuit 27, and a relay 29 driven by the relay driver 28. When this slow stop instruction circuit 22 detects attainment of the acceleration limit level as soon as the acceleration level reaches the acceleration limit, it applies a stop instruction output signal to the slow stop circuit 23. The slow stop circuit 23 comprises a relay contact 30 actuated by the relay 29 in the slow stop instruction circuit 22, a second order lag circuit 31 (which may be alternatively a first order lag circuit or the like) controlling the output voltage of the relay contact 30 so as to cause a gradual variation of such a voltage, and a multiplier 32 multiplying the output signal from the last-stage integrator in the second order lag circuit 31 by the displacement output signal $r_m$ from the acceleration limiter circuit 12. The output signal of the multiplier 32 provides the displacement signal applied to the servosystem.

In the normal operating condition in which the relay 29 is not energized, the relay contact 30 is kept in its closed position, and a voltage of −10 volts appears from the last-stage integrator in the second order lag circuit 31. In that condition, therefore, the displacement output signal $r_m$ of the acceleration limiter circuit 12 appears intact at the output terminal of the multiplier 32 in the slow stop circuit 23. When, on the other hand, an excessively high acceleration is detected to energize the relay 29, the relay contact 30 is now opened from its closed position, and a voltage of 0 volt appears at the output of the relay contact 30. Consequently, the output voltage of the second order lag circuit 31 is gradually attenuated from the level of −10 volts to the level of 0 volt. At the same time, the displacement output signal $r_m$ of the acceleration limiter circuit 12 is also gradually attenuated to slowly stop the operation of the servosystem. The modification shown in FIG. 7 can therefore solve the aforementioned problem of the excessive increase in the displacement of the shake table 5 beyond the limit.

It will be understood from the foregoing detailed description of the present invention that the displacement reference input signal supplied from the signal source is not directly applied to the servosystem but is applied to the servosystem after being suitably modified by the acceleration limiter circuit 12 so that an acceleration higher than a predetermined level may not be imparted to the shake table 5. Thus, an excessively high acceleration is not imparted to the test structure 11 placed on the shake table 5. The present invention is therefore advantageous in that the test structure 11 placed on the shake table 5 can be protected against damage, and the control of the servosystem can be improved remarkably.

We claim:

1. A servosystem comprising a servo-valve converting an externally applied displacement reference input signal into a corresponding hydraulic power, an actuator driven by the hydraulic power supplied from said servo-valve, a movable part actuated by said actuator to make controlled displacement, an acceleration limiter circuit comprising means for producing an acceleration signal on the basis of the displacement reference input signal, limiting the amplitude of the acceleration signal to a level lower than a predetermined level, producing a displacement signal on the basis of the limited acceleration signal, and applying this displacement signal to said servo-valve, a slow stop instruction circuit comparing the amplitude of the acceleration signal from said acceleration limiter circuit with a predetermined setting and generating a slow stop instruction signal for slowly stopping the motion of said movable part when the amplitude of the acceleration signal exceeds the setting, and a slow stop circuit attenuating the displacement signal from said acceleraton limiter circuit in response to the slow stop instruction signal applied from said slow stop instruction circuit thereby slowly stopping the motion of said movable part.

2. A servosystem as claimed in claim 1, wherein said acceleration limiter circuit comprises a limiter including a limiting element and a differentiator for limiting the amplitude of the acceleration signal to a level lower than the predetermined level, a first integrator converting the limited acceleration signal from said limiter into a velocity signal, and a second integrator converting the velocity signal from said first integrator into a displacement signal.

3. A servosystem as claimed in claim 1, wherein said slow stop instruction circuit comprises an absolute value circuit finding the absolute value of the acceleration signal from said limiter in said acceleration limiter circuit, a comparator circuit comparing the amplitude of the absolute value signal from said absolute value circuit with a predetermined setting, and a relay circuit actuated by said comparator circuit to generate the slow stop instruction signal.

4. A servosystem as claimed in claim 1, wherein said slow stop circuit comprises a relay contact actuated by said relay circuit in said slow stop instruction circuit, a second order lag circuit controlling the output voltage of said relay contact so as to cause a gradual variation of the output voltage, and a multiplier multiplying the output signal of the last-stage integrator in said second order lag circuit by the displacement output signal from said acceleration limiter circuit.

* * * * *